United States Patent [19]

Holroyd et al.

[11] Patent Number: 4,967,821
[45] Date of Patent: Nov. 6, 1990

[54] PNEUMATIC TIRE HAVING CARCASS PLY END PORTIONS ANCHORED IN EACH BEAD BUNDLE

[75] Inventors: Eric Holroyd, High Legh Park; Anthony R. Wright, Southport, both of England

[73] Assignee: Apsley Metals Limited, United Kingdom

[21] Appl. No.: 284,810

[22] Filed: Dec. 14, 1988

Related U.S. Application Data

[63] Continuation of Ser. No. 892,056, Aug. 1, 1986, abandoned.

[30] Foreign Application Priority Data

Aug. 3, 1985 [GB] United Kingdom ............... 8519579

[51] Int. Cl.⁵ .............................................. B60C 15/00
[52] U.S. Cl. ...................................... 152/540; 152/552
[58] Field of Search ............. 152/539, 540, 545, 548, 152/550, 552, 553, 554, 560; 156/117, 135; 245/1.5

[56] References Cited

U.S. PATENT DOCUMENTS

| | | | |
|---|---|---|---|
| 1,294,063 | 2/1919 | Dickinson | 152/545 X |
| 1,726,755 | 9/1929 | Morris | |
| 1,875,643 | 9/1932 | Musselman | 156/135 X |
| 2,139,840 | 12/1938 | McKone | |
| 2,994,358 | 8/1961 | Trevaskis | |
| 3,111,976 | 11/1963 | Delobelle | |
| 3,301,303 | 1/1967 | Travers | 152/545 |
| 3,815,652 | 6/1974 | Pouilloux | |
| 4,602,973 | 7/1986 | Holroyd et al. | 156/177 |

FOREIGN PATENT DOCUMENTS

| | | |
|---|---|---|
| 2408474 | 8/1975 | Fed. Rep. of Germany . |
| 1327810 | 4/1962 | France . |
| 1328752 | 7/1962 | France ............... 152/540 |
| 0105806 | 6/1983 | Japan ................. 152/545 |
| 256290 | 8/1926 | United Kingdom . |
| 320535 | 10/1929 | United Kingdom . |

*Primary Examiner*—Michael W. Ball
*Assistant Examiner*—Geofrey L. Knable
*Attorney, Agent, or Firm*—Stevens, Davis, Miller & Mosher

[57] ABSTRACT

A pneumatic tire (10) having a pair of beads (15) each of which comprises a plurality of bundled together wire hoops (40), and a carcass ply (16) extending between the beads 15. The end portions (30) of the carcass ply are anchored in each bead bundle (15) by at least one hooped member (40), (22) or (23) incorporated in the bead configuration. The carcass ply (16) may be reinforced by a continuous cord formed as a series of windings looped around a pair of hooped support elements (22) or (23) which are incorporated into each bead (15) to occupy a position with the bead configuration.

9 Claims, 2 Drawing Sheets

PNEUMATIC TIRE HAVING CARCASS PLY END PORTIONS ANCHORED IN EACH BEAD BUNDLE

This application is a continuation, of application Ser. No. 892,056, filed Aug. 1, 1986, now abandoned.

This invention relates to pneumatic tires and in particular to radial construction penumatic tires for automobiles.

A pneumatic tire normally comprises a carcass ply of elastomeric material reinforced by substantially parallel cords which extend from one bead to the other bead of the tire. These cords are typically made of polyester, nylons, aromatic polyamide, or steel wire. In a radial tire the cords make a bias angle with the centre plane of the tire of between 70° and 90°. The carcass reinforcement cords resist expansion of the tire carcass under inflation pressures and it is therefore essential that the carcass is securely anchored at the tire beads. In a conventional tire the carcass ply passes axially on one side of each bead and is turned back on itself around the axially other side of each bead so that each bead is located in a looped portion of the carcass ply. In some tires the turn-up portions of the carcass ply can extend for a considerable distance radially outwardly of the beads for example up to the mid-sidewall of the tire.

In other tires, for example, as shown in British Patent GB 256290, or WO 83/02749, (U.S. Pat. No. 4,602,973) the carcass is formed by winding a continuous reinforcing cord in a series of side by side windings around a pair of spaced apart beads so that the beads are located within the looped end portions of the carcass reinforcement cord where the cord turns back on itself. The present invention provides an alternative means by which the carcass ply is anchored to the beads of the tire.

Accordingly there is provided a pneumatic tire having a pair of axially spaced annular beads each of which comprise a plurality of bundled together hoops of wire, and a cord reinforced carcass ply extending between the annular beads wherein the respective ends of the carcass ply are anchored within each bead bundle by at least one hooped member incorporated in the bead configuration and holding said end in its respective bead.

The carcass ply is reinforced by a continuous cord formed as a series of windings looped around a pair of support elements, which are each in the form of a hoop, and wherein each support element is incorporated into each bead of bundled wire hoops so that it occupies a position within the normal bundled bead wire configuration.

The support elements may be wires which are inserted into a winding of carcass ply material of the type described in published U.K. Application No. 2159185, one wire being placed at each edge of a winding of cord passing around the wires and remaining in position as rubberized ply material is produced by the application of thin sheets of rubber to the upper and lower surfaces of the cord winding.

The finished plies consist of lengths of rubberized parallel cord fabric (which may conveniently be severed from continuously produced fabric) in which the edge loops of the winding are retained by the wires.

When built into a tire, a ply of the above kind may have its support wires circled and welded to form a hoop which is fitted within the bead wire configuration so as to anchor the loops of cord securely within the bead bundle.

Alternatively the wires can have a length several times that of the ply so that the wires can be formed into a plurality of circular turns and the portion of the wire passing through the edge loops of the ply also forms a complete single turn of the continuous turns, which are bundled to form the beads.

The invention will be described by way of example and with reference to the accompanying drawings in which.

Figure 1:
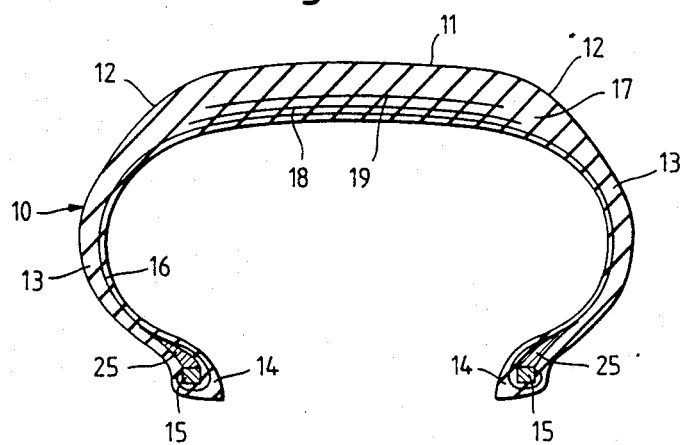
FIG. 1 is a schematic cross-section through a tire according to this invention.

With reference to FIG. 1, there is illustrated a radial carcass tire 10 intended for use on a passenger car. The tire 10 has a ground contacting tread portion 11 having shoulder portions 12 on each axial side thereof. Sidewalls 13 extend radially inwardly from the shoulders 12 and terminate in bead portion 14 which are each reinforced by an annular bead 15, and an apex 25 radially outwardly of the bead.

The tire is reinforced by an annular carcass ply 16 which extends from one bead 15 to the other bead 15, through the sidewalls 13 and under the tread 11. The tread portion 11 in its crown region is further reinforced by a breaker 17 comprising a pair of annular belts 18 and 19.

Figure 3:
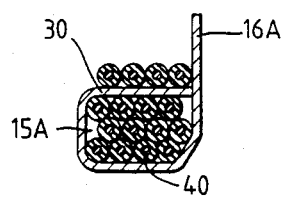
FIG. 3 is a detailed cross-sectional view of a carcass ply and bead wire assembly as can be used in the tire of FIG. 1.

The FIG. 3 the carcass ply 16A is of conventional construction with the end portion 30 anchored within the bead 15A. The bead 15A is preferably, of a construction in which it is formed by winding a continuous steel wire cord 40 in a plurality of turns which are bundled together in a predetermined configuration, in this case substantially square, although it could be round or hexagonal or any other commonly used configuration. The end portion 30 of the carcass ply is anchored within the bead 15, as shown, or at some other suitable position within the configuration of the bead. Furthermore, the number of hooped turns in the bead wire, while shown as sixteen turns, in this example, will vary dependant upon the construction and end use of the tire.

Figure 2:
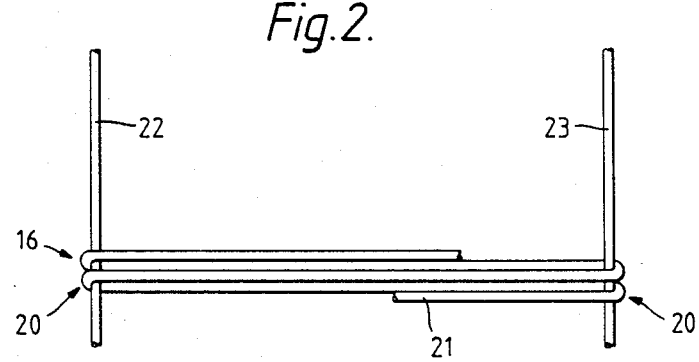
FIG. 2 is a schematic drawing of a carcass ply reinforcement of the tire used in the tire shown in FIG. 1.

According to the invention the carcass ply 16 is of the construction shown in FIG. 2 in which a continuous reinforcing cord 21 is wound helically around a pair of axially spaced support members 22 and 23 which are preferably made of steel wire, so that the support members are located within a respective series of cord loops 20 formed at the edges of the ply 16.

Figure 6:
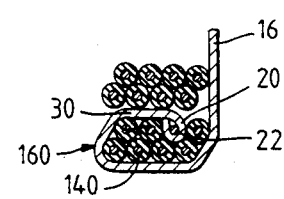
FIG. 6 is a detailed cross-sectional view of a third carcass ply and bead wire assembly also as is used with the carcass ply of FIG. 2.
Figure 4:
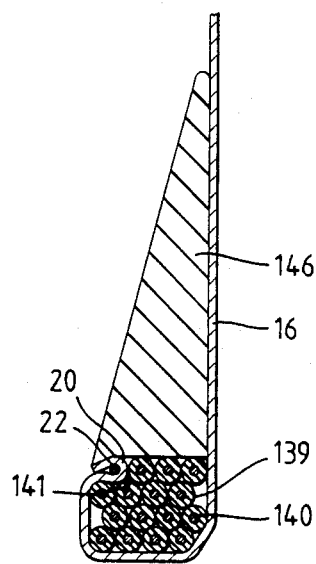
FIG. 4 is a detailed cross-section of a bead wire assembly as can be used in the tire of FIG. 1 with carcass ply as shown in FIG. 2.
Figure 5:
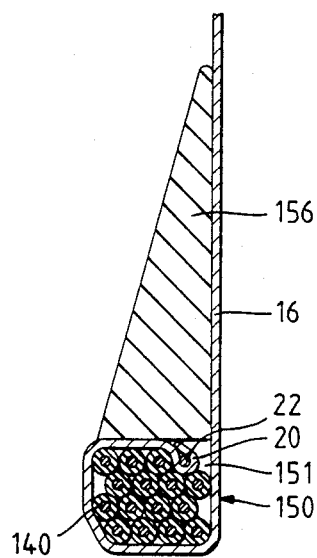
FIG. 5 is a detailed cross-sectional view of a second bead wire assembly as is used with the carcass ply of FIG. 2.

With a carcass 16 as described above, then the tire 10 in accordance with this invention, can have a bead construction as shown in FIG. 4, FIG. 5 and FIG. 6.

With reference to FIG. 4, each bead bundle 139 comprises a plurality of bundled together hoops of wire 140 which are not located within the cord loops 20. The bead wire assembly 139 is formed from a four layer winding of inextensible rubberized steel wires or cords 140. The wires 140 can be formed from a flat strip of four parallel wires wound in a plurality of layers, and in one layer of wires, preferably the radially outer layer, one winding of a wire omitted to form a notch, or space, 141 in the normal bead wire configuration on the axially outer side thereof. The support element 22 or 23 for the carcas ply 16 is fitted into the vacated position in the bead wire configuration so that the looped ends 20 of the ply 16 are anchored within the bead bundle by the wire support element 22 or 23. The position 141 of the support element 22 is selected so that the carcass ply 30 (as referenced in FIG. 6) is wrapped around the bead bundle 139 from one axial side to the other axial side thereof. The support elements 22 and 23 may be formed as single complete wire hoops which may be unbroken, or broken as desired. The bead bundle 139 may also be formed as a plurality of bundled together hoops of continuous wire and the support element 22 may be constituted by a single turn of the same continuous wire located within the cord loops 20 and the other hoops are not located within the cord loops 20. A rubber apex strip 146 is positioned on the bead 140 radially outwardly thereof.

FIG. 5 shows an alternative construction in which a bead bundle 150 is formed with a notch 151 on its axially inner side for reception of the support element 22 or 23 and cord loop 20, the ply 16 making a full turn around the bead bundle. An apex 156 is fitted radially outwardly of the bead wire assembly 151.

With reference to FIG. 6, there is shown yet another embodiment of the invention, each support element 22 or 23 is encased in the centre of the configured bead bundle 160 during the manufacture of the bead. In this example, the bead bundle 160 is square and although a particular position within the bead bundle is illustrated as the location of the support 22 or 23 element, it will be appreciated that other positions within the bead wire configuration are equally suitable. As can be seen in FIGS. 4–6, the support element 22 has the same cross-sectional size as the hoops of wire 140 so that the support element 22 occupies a respective position in the configured bundle 160, when the hoops of wire 140 are packed together in the predetermined configuration, that would have been occupied by one of the hoops of wire in its stead.

The function of the support wire elements 22 or 23 in the examples described above is to anchor the ply edges 20 to the bead wire assemblies both during building and in the finalised tire. The support elements in FIG. 4 and FIG. 5 can be secured in position on the sides of the bead bundles 140, 150, by any suitable means, e.g. the green adhesive strength of the rubber coating on the wire, brazing, surrounding the bead bundles with cord to hold it together. This feature is important in the finished tire, but after vulcanisation of the surrounding rubber less strength is required in the mechanical lock provided by the wire support element since adhesion of the ply cords to the surrounding rubber then provides a firmer anchorage. Before vulcanisation, and particularly during shaping of the carcass to toroidal form, the wire support elements positively resist displacement of the ply edges under the tension set up in the ply cords. Provided that adequate support can be provided by bead clamps during shaping, it may therefore be possible to use support elements other than complete (e.g. welded) wire support rings : the wires may simply be circled and overlapped without the ends being directly secured together by welding, or may be replaced by relatively weaker support elements such as plastics or textile cords or filaments. In such alternatives greater reliance would be placed on the vulcanisation of the surrounding rubber to maintain integrity of the support element in the finished tire.

Tires made in accordance with the invention as described above have the advantage that less ply cord material is used than in conventional tires, because of the elimination of the ply turn-ups. Positively anchored ply edges, together with accurately located bead wire assemblies will also provide greater uniformity in performance.

While the invention has been described with reference to the examples shown in the drawings it will be appreciated that the man skilled in the art can make minor modifications and alterations without departing from the scope and spirit of the invention, for example, the bead bundles could be formed in alternative ways.

We claim:

1. A radial carcass pneumatic tire having a pair of axially spaced annular beads each of which comprises a bead bundle, and a cord reinforced carcass ply extending between the annular beads, said carcass ply being reinforced by a single continuous cord wound as a series of adjacent windings around a pair of support elements which are each in the form of a hoop so that each support element is located within a respective series of cord loops which form the respective ends of the ply, each said bead bundle comprising a plurality of bundled together hoops of wire which are not located within said cord loops, said hoops of wire being bundled together in a predetermined bead configuration in which each hoop of wire occupies a respective position so that said hoops of wire are packed together, and said support elements within the respective series of cord loops are also each incorporated into a respective bead bundle to occupy a respective position within the predetermined bead configuration instead of the hoop of wire that would occupy that position, wherein in each said bead bundle, the bundled together hoops of wire are formed from a flat strip of parallel wires spirally wound in a plurality of layers, and in one of said layers a turn of one of said parallel wires is omitted to form a notch or space within the bead bundle into which said support element within the cord loops is located.

2. A pneumatic tire as claimed in claim 1 wherein each support element is in the form of a complete hoop.

3. A pneumatic tire as claimed in claim 2 wherein the support elements are each formed as a continuous unbroken ring of wire.

4. A tire as claimed in claim 1 wherein the support element occupies a position in the outer layer of the respective bead wire configuration.

5. A radial carcass pneumatic tire having a pair of axially spaced annular beads each of which comprises a bead bundle and a cord reinforced carcass ply extending between the annular beads, said carcass ply being reinforced by a single continuous cord wound as a series of adjacent windings around a pair of support elements which are each in the form of a hoop so that each support element is located within a respective series of cord loops which form the end of the ply, so that the respective ends of the carcass ply are anchored within each bead bundle by the respective support element being incorporated in the bead bundle to hold said end to its respective bead, each of said bead bundles comprising a plurality of bundled together hoops of wire which are not located within said cord loops, each said support element and each respective plurality of bundled together wire hoops which are not located within said cord loops being formed from one and the same continuous wire.

6. A pneumatic tire as claimed in claim 5, wherein the support elements are anchored in position in an outer layer of the respective bead bundle.

7. A pneumatic tire as claimed in claim 5 wherein the support elements are located on the axially outer side of each bead bundle.

8. A pneumatic tire as claimed in claim 5 wherein the support elements are located on the axially inner side of each bead bundle.

9. A radial carcass pneumatic tire having a pair of axially spaced annular beads each of which comprises a bead bundle, and a cord reinforced carcass ply extending between the annular beads, said carcass ply being reinforced by a single continuous cord wound as a series of adjacent windings around a pair of support elements which are each in the form of a hoop so that each support element is located within a respective series of loops formed by said continuous cord and which form the respective ends of the ply, each said bead bundle comprising a plurality of bundled together hoops of wire which are not located within said cord loops, said hoops of wire being bundled together in a predetermined bead configuration in which each hoop of wire occupies a respective position in the configured bundle when said hoops of wire are packed together, said support elements each being able to occupy a position in the configured bundle, which position would have been filled by one of said hoops of wire such that support elements within the respective series of cord loops are also each incorporated into a respective bead bundle to occupy a respective position within the predetermined bead configuration instead of the hoop of wire that would occupy that position, said position of each said support being such that the carcass ply is wrapped around at least a portion of the bead bundle from one axial side of the respective bead bundle to the other axial side thereof.

* * * * *